United States Patent [19]

Tai

[11] Patent Number: 5,258,850
[45] Date of Patent: Nov. 2, 1993

[54] LINE SCREEN DESIGN FOR GRAY SCALE RENDERING

[75] Inventor: Hwai-Tzuu Tai, Rochester, N.Y.

[73] Assignee: Eastman Kodak Company, Rochester, N.Y.

[21] Appl. No.: 895,988

[22] Filed: Jun. 5, 1992

[51] Int. Cl.$^5$ .............................................. H04N 1/23
[52] U.S. Cl. ................... 358/298; 358/457; 358/459
[58] Field of Search ............... 358/300, 296, 298, 455, 358/456, 457, 459, 462, 465, 466; 346/160, 108, 1.1

[56] References Cited

U.S. PATENT DOCUMENTS 4,736,254 4/1988 Kotera et al. ..................... 358/298
4,814,886 3/1989 Kuge et al. ....................... 358/298

Primary Examiner—Edward L. Coles, Sr.
Assistant Examiner—Scott A. Rogers
Attorney, Agent, or Firm—Norman Rushefsky

[57] ABSTRACT

A method and arrangement for reproducing an original image, includes scanning and digitizing an original image into pixels of a digitized image. The pixels of the digitized image are arranged into cells. A gray level halftone printer is then controlled to form dots along lines in accordance with at least a first template corresponding to increasing cell gray levels until a first line structure is stable. The printer is then controlled to form dots along lines in accordance with at least a second template corresponding to further increasing cell gray levels.

23 Claims, 10 Drawing Sheets

LINE STRUCTURE BASIS

1 SOLID LINE

2ND LINE STARTS

SOLID CELL

2ND SOLID LINE

| | LEVEL 1 | | | | | LEVEL 5 | | |
|---|---|---|---|---|---|---|---|---|
| 43 | 36 | 22 | 8 | | 47 | 40 | 26 | 12 |
| 15 | ① | 29 | 50 | | 19 | 5 | 33 | 54 |
| 22 | 8 | 43 | 36 | | 26 | 12 | 47 | 40 |
| 29 | 50 | 15 | 1 | | 33 | 54 | 19 | 5 |

(30 points to LEVEL 1 box)

| | LEVEL 2 | | | | | LEVEL 6 | | |
|---|---|---|---|---|---|---|---|---|
| 44 | 37 | 23 | 9 | | 48 | 41 | 27 | 13 |
| 16 | 2 | 30 | 51 | | 20 | 6 | 34 | 55 |
| 23 | 9 | 44 | 37 | | 27 | 13 | 48 | 41 |
| 30 | 51 | 16 | 2 | | 34 | 55 | 20 | 6 |

| | LEVEL 3 | | | | | LEVEL 7 | | |
|---|---|---|---|---|---|---|---|---|
| 45 | 38 | 24 | 10 | | 49 | 42 | 28 | 14 |
| 17 | 3 | 31 | 52 | | 21 | 7 | 35 | 56 |
| 24 | 10 | 45 | 38 | | 28 | 14 | 49 | 42 |
| 31 | 52 | 17 | 3 | | 35 | 56 | 21 | 7 |

| | LEVEL 4 | | |
|---|---|---|---|
| 46 | 39 | 25 | 11 |
| 18 | 4 | 32 | 53 |
| 25 | 11 | 46 | 39 |
| 32 | 53 | 18 | 4 |

| | LEVEL 1 | | | | | LEVEL 5 | | |
|---|---|---|---|---|---|---|---|---|
| 7 | 6 | 4 | 2 | | 39 | 38 | 36 | 34 |
| 3 | ① | 5 | 8 | | 35 | 33 | 37 | 40 |
| 4 | 2 | 7 | 6 | | 36 | 34 | 39 | 38 |
| 5 | 8 | 3 | 1 | | 37 | 40 | 35 | 33 |

| | LEVEL 2 | | | | | LEVEL 6 | | |
|---|---|---|---|---|---|---|---|---|
| 15 | 14 | 12 | 10 | | 47 | 46 | 44 | 42 |
| 11 | 9 | 13 | 16 | | 43 | 41 | 45 | 48 |
| 12 | 10 | 15 | 14 | | 44 | 42 | 47 | 46 |
| 13 | 16 | 11 | 9 | | 45 | 48 | 43 | 41 |

| | LEVEL 3 | | | | | LEVEL 7 | | |
|---|---|---|---|---|---|---|---|---|
| 23 | 22 | 20 | 18 | | 55 | 54 | 52 | 50 |
| 19 | 17 | 21 | 24 | | 51 | 49 | 53 | 56 |
| 20 | 18 | 23 | 22 | | 52 | 50 | 55 | 54 |
| 21 | 24 | 19 | 17 | | 53 | 56 | 51 | 49 |

| | LEVEL 4 | | |
|---|---|---|---|
| 31 | 30 | 28 | 26 |
| 27 | 25 | 29 | 32 |
| 28 | 26 | 31 | 30 |
| 29 | 32 | 27 | 25 |

| LEVEL 1 | | | | | LEVEL 5 | | | |
|---|---|---|---|---|---|---|---|---|
| 31 | 26 | 16 | 6 | | 35 | 30 | 20 | 10 |
| 11 | ① | 21 | 36 | | 15 | 5 | 25 | 40 |
| 16 | 6 | 31 | 26 | | 20 | 10 | 35 | 30 |
| 21 | 36 | 11 | 1 | | 25 | 40 | 15 | 5 |

| LEVEL 2 | | | | | LEVEL 6 | | | |
|---|---|---|---|---|---|---|---|---|
| 32 | 27 | 17 | 7 | | 47 | 46 | 44 | 42 |
| 12 | 2 | 22 | 37 | | 43 | 41 | 45 | 48 |
| 17 | 7 | 32 | 27 | | 44 | 42 | 47 | 46 |
| 22 | 37 | 12 | 2 | | 45 | 48 | 43 | 41 |

| LEVEL 3 | | | | | LEVEL 7 | | | |
|---|---|---|---|---|---|---|---|---|
| 33 | 28 | 18 | 8 | | 55 | 54 | 52 | 50 |
| 13 | 3 | 23 | 38 | | 51 | 49 | 53 | 56 |
| 18 | 8 | 33 | 28 | | 52 | 50 | 55 | 54 |
| 23 | 38 | 13 | 3 | | 53 | 56 | 51 | 49 |

| LEVEL 4 | | | |
|---|---|---|---|
| 34 | 29 | 19 | 9 |
| 14 | 4 | 24 | 39 |
| 19 | 9 | 34 | 29 |
| 24 | 39 | 14 | 4 |

FIG. 7

| THRESHOLD LEVEL 1 | | | | THRESHOLD LEVEL 6 | | | | THRESHOLD LEVEL 11 | | | |
|---|---|---|---|---|---|---|---|---|---|---|---|
| 56 | 67 | 34 | 12 | 61 | 72 | 39 | 17 | 66 | 77 | 44 | 22 |
| 23 | 1 | 45 | 78 | 28 | 6 | 50 | 83 | 33 | 11 | 55 | 88 |
| 34 | 12 | 56 | 67 | 39 | 17 | 61 | 72 | 44 | 22 | 66 | 77 |
| 45 | 78 | 23 | 1 | 50 | 83 | 28 | 6 | 55 | 88 | 33 | 11 |

| THRESHOLD LEVEL 2 | | | | THRESHOLD LEVEL 7 | | | | THRESHOLD LEVEL 12 | | | |
|---|---|---|---|---|---|---|---|---|---|---|---|
| 57 | 68 | 35 | 13 | 62 | 73 | 40 | 18 | 94 | 95 | 92 | 90 |
| 24 | 2 | 46 | 79 | 29 | 7 | 51 | 84 | 91 | 89 | 93 | 96 |
| 35 | 13 | 57 | 68 | 40 | 18 | 62 | 73 | 92 | 90 | 94 | 95 |
| 46 | 79 | 24 | 2 | 51 | 84 | 29 | 7 | 93 | 96 | 91 | 89 |

| THRESHOLD LEVEL 3 | | | | THRESHOLD LEVEL 8 | | | | THRESHOLD LEVEL 13 | | | |
|---|---|---|---|---|---|---|---|---|---|---|---|
| 58 | 69 | 36 | 14 | 63 | 74 | 41 | 19 | 102 | 103 | 100 | 98 |
| 25 | 3 | 47 | 80 | 30 | 8 | 52 | 85 | 99 | 97 | 101 | 104 |
| 36 | 14 | 58 | 69 | 41 | 19 | 63 | 74 | 100 | 98 | 102 | 103 |
| 47 | 80 | 25 | 3 | 52 | 85 | 30 | 8 | 101 | 104 | 99 | 97 |

| THRESHOLD LEVEL 4 | | | | THRESHOLD LEVEL 9 | | | | THRESHOLD LEVEL 14 | | | |
|---|---|---|---|---|---|---|---|---|---|---|---|
| 59 | 70 | 37 | 15 | 64 | 75 | 42 | 20 | 110 | 111 | 108 | 106 |
| 26 | 4 | 48 | 81 | 31 | 9 | 53 | 86 | 107 | 105 | 109 | 112 |
| 37 | 15 | 59 | 70 | 42 | 20 | 64 | 75 | 108 | 106 | 110 | 111 |
| 48 | 81 | 26 | 4 | 53 | 86 | 31 | 9 | 109 | 112 | 107 | 105 |

| THRESHOLD LEVEL 5 | | | | THRESHOLD LEVEL 10 | | | | THRESHOLD LEVEL 15 | | | |
|---|---|---|---|---|---|---|---|---|---|---|---|
| 60 | 71 | 38 | 16 | 65 | 76 | 43 | 21 | 118 | 119 | 116 | 114 |
| 27 | 5 | 49 | 82 | 32 | 10 | 54 | 87 | 115 | 113 | 117 | 120 |
| 38 | 16 | 60 | 71 | 43 | 21 | 65 | 76 | 116 | 114 | 118 | 119 |
| 49 | 82 | 27 | 5 | 54 | 87 | 32 | 10 | 117 | 120 | 115 | 113 |

FIG. 8

FIRST LINE

| TEMPLATE A | TEMPLATE B | TEMPLATE C |

189
SCREEN
PITCH

| TEMPLATE D | TEMPLATE E |

SECOND LINE  THIRD LINE

FIG. 10

LEVEL 1

| 23 | 57 | 1 | 23 | 58 | 1 |
| 59 | 1 | 21 | 60 | 1 | 21 |
| 1 | 22 | 62 | 1 | 22 | 61 |
| 23 | 58 | 1 | 23 | 59 | 1 |
| 60 | 1 | 21 | 61 | 1 | 22 |
| 1 | 22 | 61 | 1 | 22 | 62 |

LEVEL 2

| 26 | 63 | 2 | 26 | 64 | 2 |
| 65 | 2 | 24 | 66 | 2 | 25 |
| 2 | 25 | 68 | 2 | 25 | 67 |
| 26 | 64 | 2 | 26 | 65 | 2 |
| 66 | 2 | 24 | 67 | 2 | 25 |
| 2 | 25 | 67 | 2 | 25 | 68 |

LEVEL 3

| 29 | 69 | 3 | 29 | 70 | 3 |
| 71 | 3 | 27 | 72 | 3 | 28 |
| 3 | 28 | 74 | 3 | 28 | 73 |
| 29 | 70 | 3 | 29 | 71 | 3 |
| 72 | 3 | 27 | 73 | 3 | 28 |
| 3 | 28 | 73 | 3 | 28 | 74 |

LEVEL 4

| 32 | 75 | 4 | 32 | 76 | 4 |
| 77 | 4 | 30 | 78 | 4 | 31 |
| 4 | 31 | 80 | 4 | 31 | 79 |
| 32 | 76 | 4 | 32 | 77 | 4 |
| 78 | 4 | 30 | 79 | 4 | 31 |
| 4 | 31 | 79 | 4 | 31 | 80 |

LEVEL 5

| 35 | 81 | 5 | 35 | 82 | 5 |
| 83 | 5 | 33 | 84 | 5 | 33 |
| 5 | 34 | 86 | 5 | 34 | 85 |
| 35 | 82 | 5 | 35 | 83 | 5 |
| 84 | 5 | 33 | 85 | 5 | 34 |
| 5 | 34 | 85 | 5 | 34 | 86 |

LEVEL 6

| 38 | 87 | 6 | 38 | 88 | 7 |
| 89 | 6 | 36 | 90 | 7 | 37 |
| 7 | 37 | 92 | 6 | 38 | 91 |
| 38 | 88 | 6 | 38 | 89 | 7 |
| 90 | 7 | 36 | 91 | 6 | 37 |
| 6 | 37 | 91 | 6 | 37 | 92 |

LEVEL 7

| 41 | 93 | 9 | 41 | 94 | 9 |
| 95 | 8 | 39 | 96 | 9 | 40 |
| 9 | 40 | 98 | 8 | 41 | 97 |
| 41 | 94 | 9 | 41 | 95 | 8 |
| 96 | 9 | 39 | 97 | 8 | 40 |
| 8 | 40 | 97 | 8 | 40 | 98 |

LEVEL 8

| 44 | 99 | 10 | 44 | 100 | 11 |
| 101 | 10 | 42 | 102 | 11 | 43 |
| 11 | 43 | 104 | 10 | 44 | 103 |
| 44 | 100 | 10 | 44 | 101 | 11 |
| 102 | 11 | 42 | 103 | 10 | 43 |
| 10 | 43 | 103 | 10 | 43 | 104 |

LEVEL 9

| 47 | 105 | 13 | 47 | 106 | 13 |
| 107 | 12 | 45 | 108 | 12 | 46 |
| 13 | 46 | 110 | 12 | 46 | 109 |
| 47 | 106 | 12 | 47 | 105 | 13 |
| 108 | 13 | 45 | 107 | 13 | 46 |
| 12 | 46 | 109 | 12 | 46 | 110 |

LEVEL 10

| 50 | 111 | 15 | 50 | 112 | 15 |
| 113 | 14 | 48 | 114 | 14 | 49 |
| 15 | 49 | 116 | 15 | 49 | 115 |
| 50 | 112 | 14 | 50 | 111 | 14 |
| 114 | 15 | 48 | 113 | 15 | 49 |
| 14 | 49 | 115 | 14 | 49 | 116 |

LEVEL 11

| 53 | 117 | 17 | 53 | 118 | 17 |
| 119 | 16 | 51 | 120 | 16 | 52 |
| 17 | 52 | 122 | 16 | 53 | 121 |
| 53 | 118 | 17 | 53 | 119 | 17 |
| 120 | 17 | 51 | 119 | 16 | 52 |
| 16 | 52 | 121 | 16 | 52 | 122 |

LEVEL 12

| 56 | 123 | 19 | 56 | 124 | 19 |
| 125 | 18 | 54 | 126 | 18 | 55 |
| 20 | 55 | 128 | 19 | 56 | 127 |
| 56 | 124 | 19 | 56 | 125 | 20 |
| 126 | 18 | 54 | 125 | 18 | 55 |
| 20 | 55 | 127 | 20 | 55 | 128 |

LEVEL 13

| 140 | 147 | 130 | 140 | 147 | 130 |
| 148 | 129 | 138 | 148 | 129 | 138 |
| 131 | 139 | 149 | 131 | 139 | 149 |
| 140 | 147 | 130 | 140 | 147 | 130 |
| 148 | 129 | 138 | 148 | 129 | 138 |
| 131 | 139 | 149 | 131 | 139 | 149 |

LEVEL 14

| 143 | 150 | 133 | 143 | 150 | 133 |
| 151 | 132 | 141 | 151 | 132 | 141 |
| 134 | 142 | 152 | 134 | 142 | 152 |
| 143 | 150 | 133 | 143 | 150 | 133 |
| 151 | 132 | 141 | 151 | 132 | 141 |
| 134 | 142 | 152 | 134 | 142 | 152 |

LEVEL 15

| 146 | 153 | 136 | 146 | 153 | 136 |
| 154 | 135 | 144 | 154 | 135 | 144 |
| 137 | 145 | 155 | 137 | 145 | 155 |
| 146 | 153 | 136 | 146 | 153 | 136 |
| 154 | 135 | 144 | 154 | 135 | 144 |
| 137 | 145 | 155 | 137 | 145 | 155 |

FIG. 11

GRAY STEP 100

| 12 | 8  | 12 | 12 | 8  | 12 | 12 |
|----|----|----|----|----|----|----|
| 7  | 12 | 12 | 7  | 12 | 12 | 7  |
| 12 | 12 | 7  | 12 | 12 | 7  | 12 |
| 12 | 8  | 12 | 12 | 8  | 12 | 12 |
| 7  | 12 | 12 | 7  | 12 | 12 | 7  |
| 12 | 12 | 7  | 12 | 12 | 7  | 12 |

FIG. 12

LINE SCREEN DESIGN FOR GRAY SCALE RENDERING

This invention is related to the following applications, filed on even date with the present application: Ser. No. 07/894,858, for Classification to Change Exposure Within a Cell of Different Pixels; Ser. No. 07/894,857, for Halftone Dot Arrangement in Gray Level Halftone Printing; Ser. No. 07/894,859, for A Method and Arrangement For Providing a Default Mode in Digital Copying; Ser. No. 07/895,555, for A Method and Arrangement For Locally Switching Gray Dot Types to Reproduce an Image With Gray Level Printing; Ser. No. 07/895,986, for An Image Processing Method to Remove Halftone Screens; Ser. No. 07/895,985, for Multi-Bit Rendering Method and Arrangement for Continuous Tone Picture Representation and Printing; and Ser. No. 07/895,554, for A Method and Apparatus For Imbedding Controlled Structure For Gray Scale Rendering. Each of these related applications is hereby expressly incorporated by reference into this application.

FIELD OF THE INVENTION

The present invention relates to the field of encoding pictorial imagery for reproduction on display or printing systems, and more particularly, to providing a screen for gray scale rendering that establishes a stable latent image structure and which has process characteristics built into it so as to be pleasing to the eye.

BACKGROUND OF THE INVENTION

In the area of digital printing (the term "printing" is used to encompass both printing and displaying throughout), gray level has been achieved in a number of different manners. The representation of the intensity, i.e., the gray level, of a color by binary displays and printers has been the object of a variety of algorithms. Binary displays and printers are capable of making a mark, usually in the form of a dot, of a given, uniform size and at a specified resolution in marks per unit length, typically dots per inch. It has been common to place the marks according to a variety of geometrical patterns such that a group of marks when seen by the eye gives a rendition of an intermediate color tone between the color of the background (usually white paper stock) and total coverage, or solid density.

Continuous tone images contain an apparent continuum of gray levels. As an approximation to continuous tone images, pictorial imagery has been represented via binary halftone technologies. In order to record or display a halftone image with a scanning system, one picture element of the recording or display surface consists of a j×k matrix of sub-elements where j and k are positive integers. A halftone image is reproduced by printing the respective sub-elements or leaving them blank, in other words, by suitably distributing the printed marks.

Halftone image processing algorithms are evaluated in part, by their capability of delivering a complete gray scale at normal viewing distances. The capability of a particular process to reproduce high frequency rendition (fine detail) with high contrast modulation makes that procedure superior to one which reproduces such fine detail with lesser or no output contrast.

Another method of producing gray levels is provided by gray level printing. In such a method, each pixel has the capability to render several different dot sizes. The dot size for a pixel is a function of the exposure time provided an LED element corresponding to that pixel. The longer the exposure time, the more toner is attracted to that particular pixel. See, for example, U.S. Pat. No. 4,680,645 for a method of rendering gray scale images with variable dot sizes.

There are two major concerns in rendering a continuous tone image for printing: (1) the resolution of image details, and (2) the reproduction of gray scales. These two fundamental factors compete with each other in a binary halftone representation scheme. The more gray levels that are rendered, the larger is the halftone cell. Consequently, coarse halftone line screens are provided, with the attendant poor image appearance. Hence, a compromise is made in rendering between the selection of line resolution and gray scales in binary halftone printing. However, with gray level halftone printing, one can satisfy both resolution and gray level requirements. In gray level printing, the same number of addressable dots are present, and there is a choice of dot sizes from one dot-size of 1 bit/pixel to 16 different dot-sizes of 4 bits/pixel. Although providing higher image quality with respect to line resolution and tonal scales, gray level halftoning presents its own dot rendering issues.

A number of different dot layouts are possible to build gray level dots from a cell template. These gray level dots are the digital representation of the gray level screening, and must be realized through a printing process. It is desirable in gray level screening to layout the dots with the printing process characteristics built into it such that the appearance of the dots are pleasing to the eye: less grainy, stable, less artifacts, less texture (i.e., visible screen and its microstructure).

There is a need for an apparatus and a method for providing a screen for gray scale rendering that establishes a stable latent image structure, and renders more gray scales for an image, and with the process characteristics built into it so that the appearance of the dots are pleasing to the eye.

SUMMARY OF THE INVENTION

This and other needs are met by the present invention which provides a method of reproducing an original image, comprising scanning and digitizing an original image into pixels of a digitized image, arranging the pixels of the digitized image into cells, controlling a gray level halftone printer to form dots along lines in accordance with at least a first template corresponding to increasing cell gray levels until a first line structure is stable, and controlling the printer to form dots along lines in accordance with at least a second template corresponding to further increasing cell gray levels.

The earlier mentioned needs are also met by the present invention which provides an arrangement for reproducing an original image, comprising a scanner which scans and digitizes the original image into pixels, a controller coupled to the scanner to receive the digitized original image and which produces a first signal corresponding to a gray level halftoned representation of the original image, and a printer coupled to the controller to receive the first signal and which produces a gray level halftoned reproduction of the original image. The controller includes means for grouping the pixels into cells and reproducing a cell gray level by controlling the printer to form dots in a cell along lines in accordance with at least one template, such that a first line structure is formed that is stable before beginning formation of additional lines within the cell corresponding to increasing cell gray levels.

The method and arrangement of the present invention provide a screen for gray scale rendering that establishes a stable latent image structure, and renders more gray scales for an image. The electrophotographic process characteristics are built into the screen so that the appearance of the dots are more pleasing to the human eye.

Other objects, advantages and novel features of the present invention will become apparent from the following detailed description of the invention when considered in conjunction with the accompanying drawings.

BRIEF DESCRIPTION OF THE DRAWINGS

FIG. 3 illustrates an exemplary 3-bit gray halftone dot layout according to a full dot type embodiment of the present invention.

FIG. 7 shows a 3-bit gray halftone dot layout according to a mixed dot type embodiment of the present invention.

FIG. 8 shows a 4-bit gray halftone dot layout according to a mixed dot type embodiment of the present invention.

FIG. 10 shows an example of templates used for gray scale rendering in accordance with an embodiment of the present invention.

FIG. 11 illustrates a 189 line gray scale dot sequence in accordance with an embodiment of the present invention.

FIG. 12 shows the exposure levels of the pixels of a cell having a gray level of 100 that has been formed according to the layout of FIG. 11.

DETAILED DESCRIPTION OF THE DRAWINGS

Figures 1, 2:
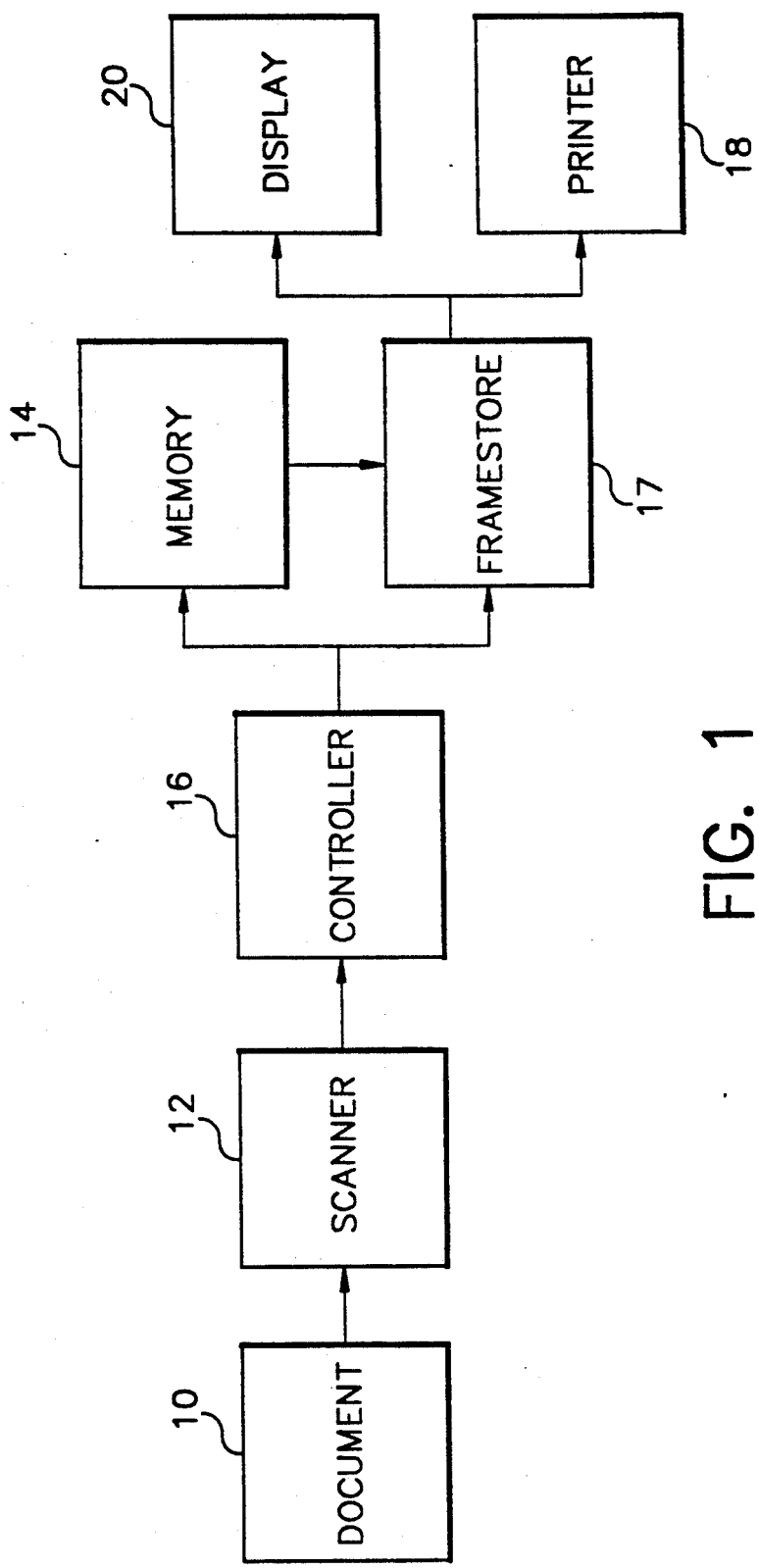
FIG. 1 shows a block diagram of a arrangement for reproducing an image, constructed in accordance with an embodiment of the present invention.
FIG. 2 shows an example of a 4×4 cell with indications of gray level for each pixel.

FIG. 1 illustrates an arrangement which reproduces a document. The document 10 can contain different types of images on the same document. For example, document 10 may contain both text and continuous tone areas, and may also contain halftone areas.

The document 10 is scanned in and digitized by a conventional scanner 12, which operates to provide digital signals representative of the densities of the areas of the document 10 corresponding to a pixel. These signals are sent to a memory (or buffer) 14. Under the direction of a controller 16, these signals may be modified and provided as gray level signals to a printer 18 and/or a display 20 for each pixel. The printer 18 and/or display 20 will then reproduce the document 10 by energizing each of the individual pixels according to the gray levels as modified (or not modified) by the controller 16. The memory 14, the controller 16, the printer 18 and the display 20 are of conventional hardware design.

In gray level printing, each pixel has the capability to render several different dot sizes, and thus different gray levels. However, instead of simply providing each pixel with an independent gray level, several pixels may be organized together to form a super-pixel, or cell. Each of the pixels in a cell is then provided with a gray level. The human visual response integrates the various gray levels of the individual pixels in the cell to a single perceived gray level for the cell. This is similar to the basic concept of binary halftoning. The number of tone scales for a cell is increased greatly, however, due to the number of different gray levels available for each pixel. For example, instead of only the two levels provided in binary halftoning for each pixel, eight levels can be provided with gray level printing for each pixel in a cell (3 bits/pixel). When the cell is made up of 4×4 pixels, for example, the gray level printing allows 121 different gray shades to be rendered for that cell. An example of a 4×4 cell 30 with numbers that represent gray levels for each pixel is shown in FIG. 2.

The formation of the dots in the pixels of a cell can be performed in a number of different manners to achieve different desired results. The dots can be formed as "full" dot, "partial" dot, or "mixed" dot to provide gray level halftoning.

FIG. 3 illustrates an example of a 3-bit gray halftone dot layout for a full dot type formation. Also illustrated are seven different pixel-dot sizes, corresponding to the sizes that each individual pixel-dot can obtain. There are 57 possible gray levels for the exemplary 4×4 cell 30 shown here. An example of the formation of a cell that is at gray level 12 will now be given.

The pixel circled in level 1, reference numeral 1, is formed to dot-size 1 in level 1. (Only one cell will be described, although the pixels of other cells will be changed according to the same layout, as shown in FIG. 3). The dot at this pixel grows larger and larger as the levels increase from level 1 to level 2 all the way to level 7. One can see that this pixel increases in value from 1 to 7 as the levels increase. If the desired gray level for the cell 30 was 7, then the formation of dots would be completed once the circled pixel has reached the dot-size of 7 in level 7. In this example, however, the gray level for the cell 30 is desired to be 12. The circled pixel has reached its maximum dot-size, so that a dot at another pixel must now start forming. This dot starts forming at the pixel indicated with a square around it in level 1, with the numeral 8.

Figure 4:
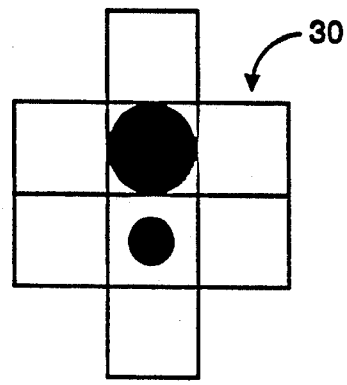
FIG. 4 shows a cell with dots that have been formed.

The dot formation process continues, with the dot at this pixel growing larger and larger as the levels again increase from level 1 to level 5. The formation process stops at level 5, since the pixel has now reached the value of 12. The halftone cell 30 now contains, as seen in FIG. 4, a dot of dot-size 7, and a dot of dot-size 5. The extension of this formation process to 57 gray levels is easy to see from this example.

Figure 5:
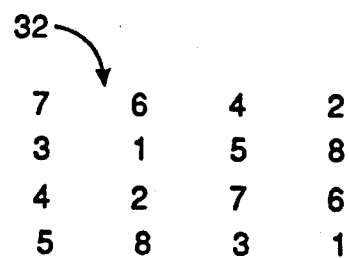
FIG. 5 illustrates an exemplary halftone dot mask.

The full dot type process thus involves forming dots at the highest priority pixels to their maximum allowable dot-size before beginning the formation of the dots at the next highest priority pixels. An exemplary halftone dot mask 32 with pixel priorities indicated is shown in FIG. 5. Different matrix sizes, cell shapes and priorities can be used for the cells than that illustrated in FIG. 3, without departing from the spirit and scope of the present invention.

In the electrophotographic process, the full dot type formation process is favored because it forms stable dots and exhibits less granularity (halftone printing noise). Another method which carries more information detail than full dot, but at the cost of less stable dots, is the partial dot type, described below.

Figure 6:
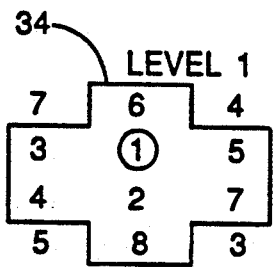
FIG. 6 shows a 3-bit gray halftone dot layout according to a partial dot type embodiment of the present invention.
Figure 6:
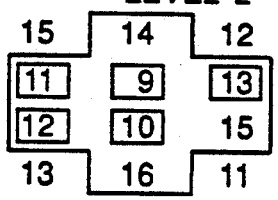

A 3-bit gray halftone dot layout for the partial dot type formation process is shown in FIG. 6. In this process, the cell 34 is built by providing a dot of the same size to each pixel in the cell to the extent possible, before building up the dot at any particular pixel to the next larger size. Thus, for a gray level of 6 for the cell 34, the circled pixel in level 1 would have a dot formed at that pixel with a dot-size of 1. For larger gray levels, for example gray level 13, each of the pixels in the cell 34 would be built up to at least dot-size of one. The pixel indicated with a square around it in level 2 would be built up to have a dot-size of two.

The partial dot formation process can thus be seen to spread out the information over the cell, and therefore carries more information detail than the full dot. It does suffer from less stable dots and more granularity, however.

The mixed dot type, discussed below, combines the merits of both the full dot and the partial dot types in gray level halftoning. A number of different processes can be provided to combine the full dot type and the partial dot type, with the specific mixed dot type being chosen based on which renders an image with more smoothness, less graininess, and more image details. Suggested strategies are: 1) build small stable dots in the highlight (toe) region; 2) keep tone response linear in the mid-tone region; 3) reduce dot structure in the shadow (shoulder) region and render more details. Based on these considerations, a specific mixed dot type can be chosen by one of ordinary skill in the art to optimize stable dots, more image detail and less graininess.

An example of a specific mixed dot type 3-bit gray halftone dot layout is illustrated in FIG. 7. As can be seen, until gray level 41 is reached, the pixels are constrained from growing beyond dot-size of 5. The pixels grow in a full dot type process, with the pixel circled growing to a dot-size of 5, with the pixel that is squared then starting to grow in size. Once all of the pixels in the cell have a dot-size of 5, corresponding to gray level 40, the cell grows using a partial dot type process. In other words, each of the pixels in the cell grows to a dot-size of 6 before any of the pixels begins growing to a dot-size of 7.

An example of a 4-bit gray halftone dot layout for mixed dot type is illustrated in FIG. 8. The formation of the dots is the same in concept to that illustrated in FIG. 7. Because there are 15 dot sizes available for each pixel, 121 gray levels for the cell are obtainable.

The layouts described above used a 4×4 cell template, and renders a picture with a 45 degree orientation, 141 screen frequency with 121 gray levels. The present invention provides a screen layout using a 6×6 cell template which will render a picture with 45 degree, 189 line-type screens at 400 dpi resolution, and can produce a maximum of 181 gray levels for the 4-bit image, although it will normally render 156 gray levels. The increase in the number of gray levels and the higher screen frequency provide the present invention with successful picture rendering results.

In the electrophotographic process, a stable latent image structure needs to be formed. Accordingly, in the present invention, several gray levels at first contribute so as to stabilize the line structure, as can be seen in the following.

Figure 9:
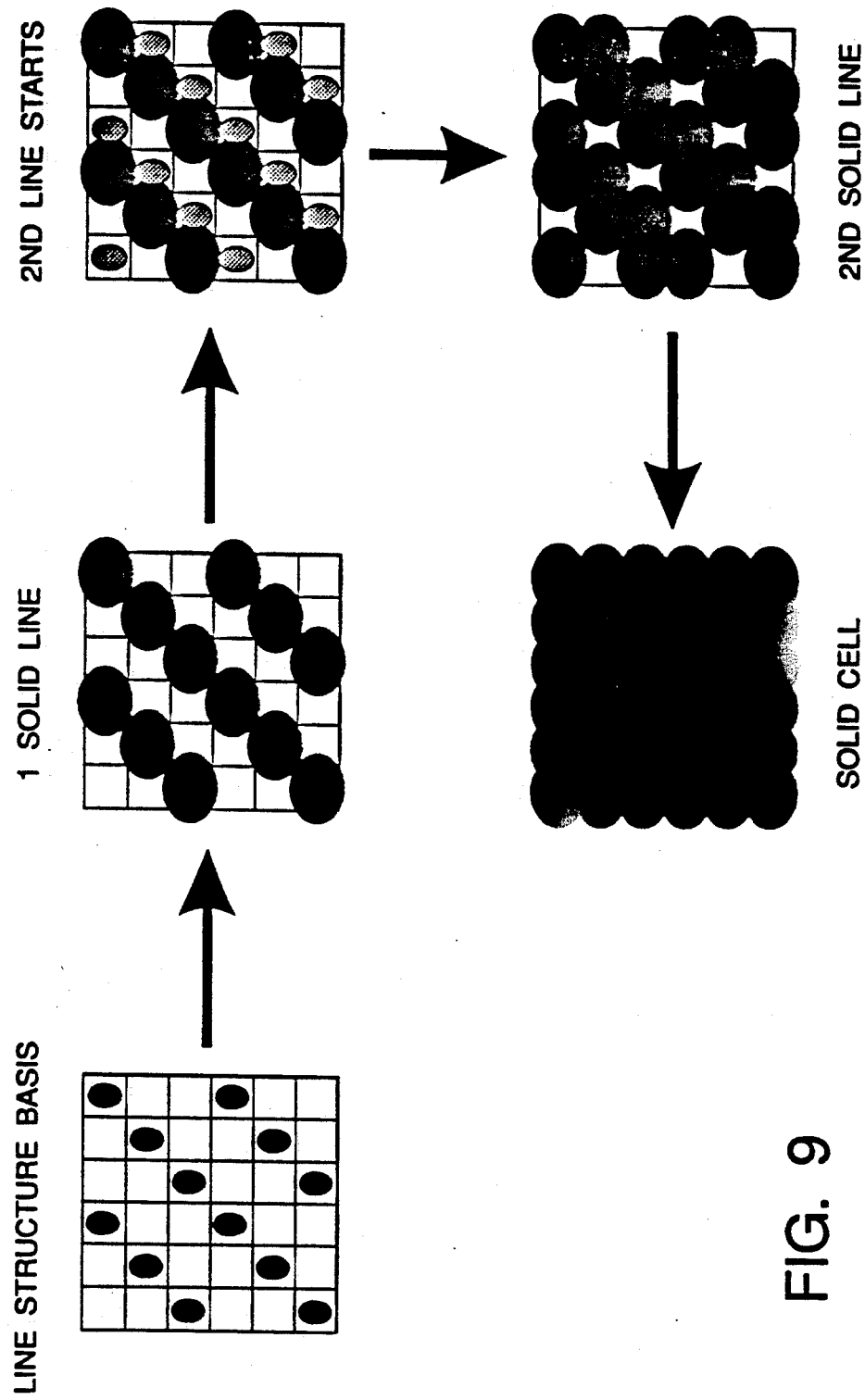
FIG. 9 is a graphic illustration of the building up of a cell in accordance with an embodiment of the present invention.

FIG. 9 graphically depicts the basic process for constructing the dots. The dots, according to a set of templates, such as those shown in FIG. 10, are built in a line-type structure. The selection of how many gray levels are used with the first template is based on the printing process characteristics in which the dots start to form a stable line structure instead of a dust appearance. An exemplary embodiment of the present invention uses the gray level of 5 for the initial line build-up, and indicated by template A of FIG. 10. The process continues by building multiple pixel dots at each gray level on top of the line structure so as to produce a more stable line structure that has a smoother shade gradation. This step uses templates B and C to build the dots.

Once the one-pixel-width line structure has been completed, construction of the other lines for higher gray levels begins according to the templates D and E. This can continue until the pixel dots fill up the cell (level 155).

FIG. 11 provides an example of a 189 line, gray scale dot sequence with indicated level numbers. In this example, there are 16 levels for each dot (15 levels and zero) because there are 4 bits/pixel. The pixels are arranged in 6×6 blocks. The formation of the dots follows the same process as already described with respect to FIGS. 3, 6, 7 and 8 for different layout designs. An example of the exposure levels for the cell at gray level 100 is shown in FIG. 12. This exposure level is found in level 8 of FIG. 11. There are a number of pixels that have been built up to exposure level 12, and those pixels that have number 100 at level 8 are indicated in FIG. 12 with exposure level 8. Those pixels in FIG. 12 that have exposure levels of 7 correspond to those pixels in FIG. 11, level 8 that are greater than 100, and so have not reached level 8 exposure yet.

From FIG. 12, showing an example of the exposure levels at gray level 100, the line structure constructed with the dot layout design of the present invention is revealed.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A method of reproducing an original image, comprising:
    scanning and digitizing an original image into pixels of a digitized image;
    arranging the pixels of the digitized image into cells;
    controlling a gray level halftone printer to form dots of at least three gray level dot sizes along lines in accordance with at least a first template corresponding to increasing cell gray levels until a first line structure is stable; and
    controlling the gray level printer to form dots of at least three gray level dot sizes along lines in accordance with at least a second template corresponding to further increasing cell gray levels.

2. The method of claim 1 wherein the pixels are grouped into a cell having 6×6 pixel locations, and the dots are capable of forming to one of fifteen different dot sizes.

3. An apparatus for reproducing an original image, comprising:
   means for scanning and digitizing the original image into pixels;
   controller means for producing a first signal corresponding to a gray level halftoned representation of the original image; and
   a gray level printer means coupled to the controller means and responsive to said first signal for producing at least three gray level dot sizes to form a gray level halftoned reproduction of the original image;
   wherein the controller means includes first means for processing the pixels by cells, each of plural pixels, and for controlling the printer means to form dots of variable size in a cell along lines in accordance with at least one template, such that a first line structure is formed that is stable before beginning formation of additional lines within the cell corresponding to increasing cell gray levels.

4. The apparatus of claim 3 wherein the controller means controls the printer means to form dots in accordance with at least two templates, with dots being formed along lines defined by a first of said two templates corresponding to increasing cell gray levels until said first line structure is stable, and then forming dots along lines defined by the other of said two templates corresponding to increasing cell gray levels.

5. The apparatus of claim 3 wherein the controller means processes the pixels into a 6×6 cell of pixels, and fifteen different levels of dots are available for printing at each pixel in the cell.

6. The apparatus of claim 4 and wherein in accordance with the first template, dot sizes are increased simultaneously at plural pixel locations along a first line in a cell when the cell gray level is increased from one cell gray level to a second and next succeeding cell gray level.

7. The apparatus of claim 6 and wherein in accordance with the first template, the plural pixel locations are contiguous.

8. The apparatus of claim 6 and wherein in accordance with the first template, all pixel locations along the first line grow simultaneously from the one cell gray level to the next succeeding cell gray level.

9. The apparatus of claim 8 and wherein in accordance with the first template pixel locations along plural parallel first lines in the cell grow simultaneously from the one cell gray level to the next succeeding cell gray level.

10. The apparatus of claim 8 and wherein in accordance with a second template, every second pixel location along the first line grows in dot size simultaneously upon an increase from a third cell gray level to a fourth next succeeding cell gray level.

11. The apparatus of claim 10 and wherein in accordance with a third template, every third pixel location along the first line grows in dot size simultaneously upon an increase from a fifth cell gray level to a sixth cell gray level.

12. The apparatus of claim 10 and wherein in accordance with a fourth template, dots are formed along a second line of pixel locations contiguous to pixel locations on the first line.

13. A method for reproducing an original image, comprising:
   scanning and digitizing the original image into pixels;
   processing the pixels by cells, each of plural pixels, wherein in accordance with at least one template, a halftone cell of one grey level is defined as having a first line structure that is stable before beginning formation of an additional line within a cell corresponding to an increased cell gray level;
   producing a first signal corresponding to a gray level halftoned representation of the original image; and
   in response to said first signal controlling a printer to produce at least three gray level dot sizes to form a gray level halftoned reproduction of the original image.

14. The method of claim 13 and including controlling the processing of the pixels with at least two templates, with pixels being assigned along lines defined by a first of said two templates corresponding to increasing cell gray levels until said first line structure is stable, and then assigning pixels along lines defined by the other of said two templates corresponding to increasing cell gray levels.

15. The method of claim 13 and including processing the pixels into a 6×6 cell of pixels, wherein fifteen different levels of dots are available for assignment at each pixel in the cell.

16. The method of claim 14 and wherein in accordance with the first template, dot sizes are increased simultaneously at plural pixel locations along a first line in a cell when the cell gray level is increased from one cell gray level to a second and next succeeding cell gray level.

17. The method of claim 16 and wherein in accordance with the first template, the plural pixel locations are contiguous.

18. The method of claim 20 and wherein in accordance with the first template, all pixel locations along the first line grow simultaneously from the one cell gray level to the next succeeding cell gray level.

19. The method of claim 18 and wherein in accordance with the first template, pixel locations along plural parallel first lines in the cell grow simultaneously from the one cell gray level to the next succeeding cell gray level.

20. The method of claim 18 and wherein in accordance with a second template, every second pixel location along the first line grows in dot size simultaneously upon an increase from a third cell gray level to a fourth next succeeding cell gray level.

21. The method of claim 20 and wherein in accordance with a third template, every third pixel location along the first line grows in dot size simultaneously upon an increase from a fifth cell gray level to a sixth cell gray level.

22. The method of claim 20 and wherein in accordance with a fourth template, dots are formed along a second line of pixel locations contiguous to pixel locations on the first line.

23. A method for printing an image, comprising:
   (a) processing pixels for forming the image by defining halftone cells, each of plural pixels, a cell of one gray level being defined in accordance with a template such that plural contiguous pixels along one line in the cell are of one dot size and a cell of a next succeeding gray level has said plural contiguous pixels of a next succeeding dot size; and
   (b) printing the image using plural dot sizes to form a gray level halftoned reproduction of the image.

* * * * *